July 31, 1956 J. C. CLARK 2,756,521
ELEVATING LOADER
Filed Sept. 16, 1952 2 Sheets-Sheet 1

INVENTOR
John C. Clark
BY
Webster & Webster
ATTY'S.

July 31, 1956 J. C. CLARK 2,756,521
ELEVATING LOADER
Filed Sept. 16, 1952 2 Sheets-Sheet 2

INVENTOR
John C. Clark
BY
Webster & Webster
ATTY'S.

United States Patent Office 2,756,521
Patented July 31, 1956

2,756,521
ELEVATING LOADER

John C. Clark, Perkins, Calif., assignor, by mesne assignments, to Harnischfeger Corporation, Milwaukee, Wis., a corporation of Wisconsin Application September 16, 1952, Serial No. 309,916

6 Claims. (Cl. 37—110)

This invention relates in general to a tractor-drawn, earth digging and loading implement.

In particular the invention is directed to, and it is a major object to provide, an improved implement of the type known generally as an elevating loader, and wherein—upon advance of the implement— a blade digs earth from a longitudinal course and delivers the dug earth to a laterally extending, upwardly inclined elevator conveyor. From the outer end of the elevator conveyor the dug and conveyed earth discharges into a truck traveling alongside the implement.

Another important object of the present invention is to provide an elevating loader wherein a novel mount vertically adjustably supports the digging blade and the lower end of the conveyor in unitary, cooperative relation; the arrangement being such that simultaneous vertical adjustment of such parts can be attained, and additionally the weight of the lower end of the elevator conveyor is imposed on the blade to assure of adequate penetration and positive digging by said blade, especially under heavy digging conditions.

An additional object of the instant invention is to provide an elevating loader which is smooth, positive, and fast acting when in use; all whereby the implement has a relatively great capacity.

It is also an object of the invention to provide an elevating loader which is of sturdy design; being capable of long and continued use, with a minimum of servicing, maintenance, or repair being required.

Still another object of the invention is to provide a practical and reliable elevating loader, and one which will be exceedingly effective for the purpose for which it is designed.

These objects are accomplished by means of such structure and relative arrangement of parts as will fully appear by a perusal of the following specification and claims.

Figure 1:
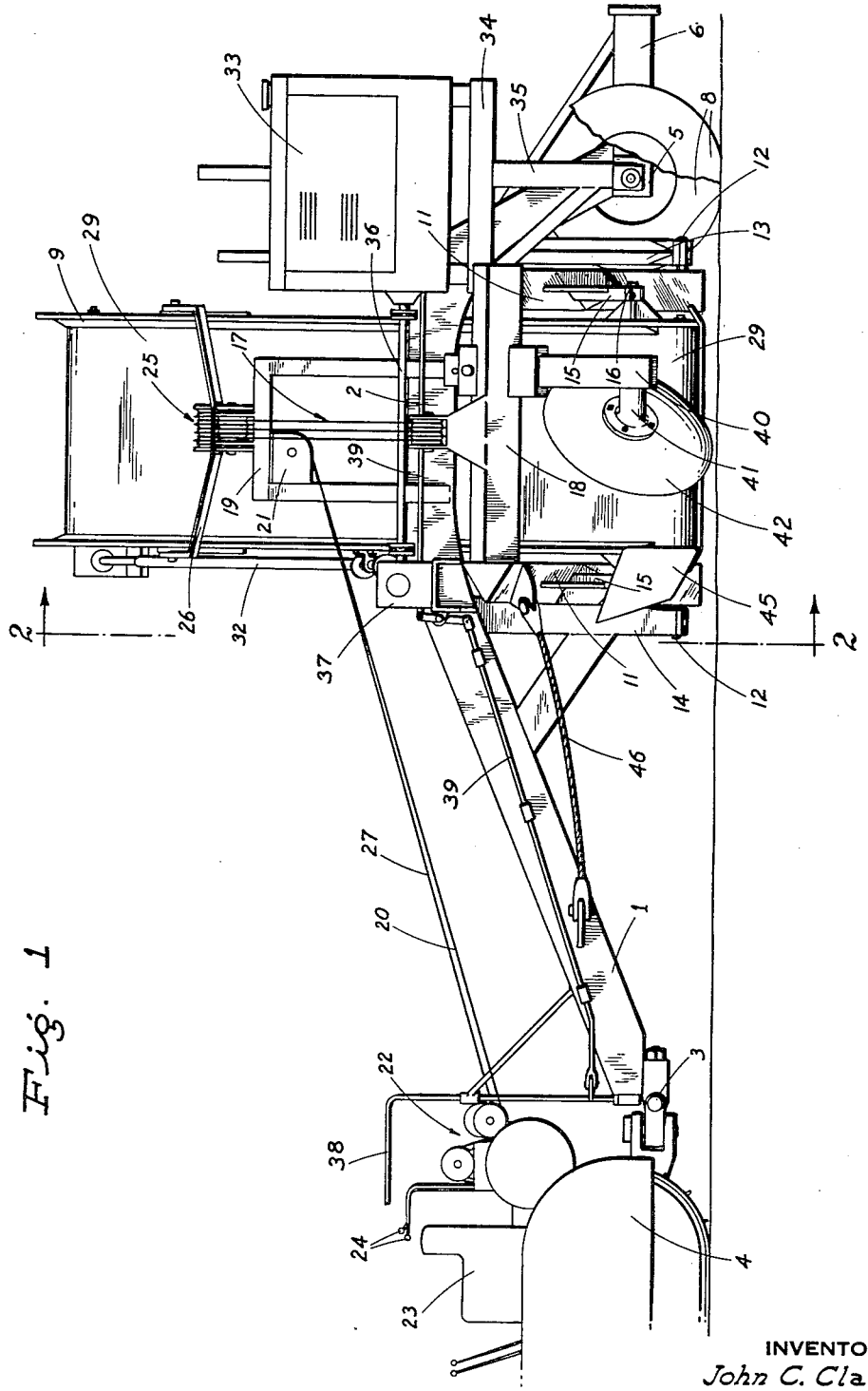
Fig. 1 is a side elevation of the implement as coupled to a tractor for use; the view being taken from the side opposite the elevator conveyor.

Referring now more particularly to the characters of reference on the drawings, the implement comprises a heavy-duty, longitudinal draft beam 1 which includes an arch 2; such draft beam being fitted, at the front, with a hitch 3 adapted to couple the implement in draft relation to a tractor 4.

At its rear end the longitudinal draft beam 1 is fixed to a transverse axle beam 5 intermediate the ends of the latter; such axle beam 5 being fitted with a rearwardly projecting pusher member 6 by means of which another tractor may, if desired, push the implement from the rear to aid the digging and loading operation.

The transverse axle beam 5 is suitably braced in order to maintain its rigidity; one of the braces—as at 7—extending at a downward incline from the longitudinal draft beam 1 to said axle beam 5.

The axle beam 5 is fitted, on opposite ends, with heavy-duty, rubber tire wheels 8; the wheels, being relatively widely spaced apart, assuring of proper and adequate stability of the implement.

A rigid, elongated elevator conveyor, indicated generally at 9, and of substantially conventional construction, extends laterally at an upward incline from a point adjacent ground level at one side of the implement; the elevator conveyor thence extending through the arch 2 and continuing upwardly for dug earth discharge, as at 10, at a relatively high point a substantial distance out from the wheel 8 on the other side of the implement.

The point of discharge 10 is sufficiently high that a truck may travel beneath the upper end of the elevator conveyor 9 whereby to receive the discharged earth in the truck body.

The elevator conveyor 9 is supported at its lower end by a novel adjustable mount constructed as follows:

A heavy-duty, U-shaped frame 11 straddles the lower end portion of the elevator conveyor 9, being inclined downwardly and laterally inwardly in opposed relation to the incline of the conveyor 9, and the open end of U-shaped frame 11 being lowermost.

At the lower end and on opposite sides, the U-shaped frame 11 is pivoted, as at 12, to the corresponding ends of rigidly mounted depending legs 13 and 14 secured in connection with the arch 2 of the longitudinal draft beam 1.

The lower ends of the U-shaped frame 11 and depending legs 13 and 14 terminate adjacent, but short of, the ground level.

On opposite sides, and intermediate the ends thereof, the U-shaped frame 11 is formed with rigid, downwardly projecting brackets 15 which are pivoted, at their lower ends, as at 16, to opposite sides of the elevator conveyor 9 immediately adjacent its lower end.

A block and tackle cable unit 17 connects between the cross head 18 at the upper end of the U-shaped frame 11, and the upper end of a rigid, upstanding extension frame 19 secured to the arch 2. The block and tackle cable unit 17 includes a pull reach 20 which turns about a direction-changing sheave 21 and thence extends forward to connection with a conventional power control unit or winch 22 mounted on the rear of the tractor 4; such winch being controlled by the tractor operator from the seat 23 through the medium of winch control levers 24.

By appropriate actuation of the block and tackle cable unit 17 by the winch 22, the U-shaped frame 11 is caused to swing upwardly or downwardly, imparting corresponding adjustment to the lower end of the elevator conveyor 9.

The outer end portion of the elevator conveyor 9 is maintained in selected position of vertical adjustment by means of another block and tackle cable unit 25 connected between a suspension yoke 26 attached to said conveyor 9 at the outer portion, and the upper end of the extension frame 19.

The block and tackle cable unit 25 includes a pull reach 27 which leads about a direction-changing sheave 28, and thence extends forwardly to connection with the power control unit or winch 22 in the same manner as the pull reach 20.

The elevator conveyor 9 includes a full-length, endless belt or draper 29 carried by a lower roller 30 and an upper roller 31; the latter being driven by an extensible drive shaft assembly, indicated generally at 32.

An engine 33 is mounted on a platform 34 supported above the axle beam 5 by a post 35 with said platform 34 secured to and disposed alongside the rear portion of the draft beam. The engine 33 includes a longitudinal or forwardly projecting drive shaft 36 which extends into a direction-changing gear box 37, and the latter drives the extensible shaft asembly 32.

In order that the operator of the tractor 4 may start or stop the endless belt 29 of the elevator conveyor 9, without leaving the seat 23, a control lever 38 is disposed adjacent the levers 24, and is arranged to work a linkage 39 which extends rearwardly to the clutch (not shown) which is included in assembly with the engine 33.

The cross head 18 of the U-shaped frame 11 is fitted, intermediate its ends, with a standard 40 having at its lower end portion a projecting spindle 41 on which a blade 42 in the form of a disc is journaled. The spindle 41 carries the disc 42 in position diagonaling in a rearward direction toward the lower end portion of the elevator conveyor 9, and canted rearwardly at the top.

With the disc 42 thus positioned, it works effectively, upon advance of the implement, to dig a course of earth, as at 43; delivering the dug earth, as at 44, onto the lower end portion of the endless belt 29, whence the latter elevates the dug earth and discharges in the manner previously described.

By virtue of the particular mounting of the lower end of the elevator conveyor 9 and disc 42, which mounting includes the vertically adjustable U-shaped frame 11, both said lower end of the elevator conveyor 9 and said disc 42 can be simultaneously adjusted up or down, while maintaining proper cooperative or working relationship therebetween. Such adjustment is of course for the purpose of setting the depth of cut, and which is dependent upon soil and working conditions.

Another important advantage of the described mount for the lower end of the elevator conveyor 9 and disc 42 resides in the fact that the weight of the conveyor at such end, together with the dug earth carried thereon, is imposed on the U-shaped frame 11, effectively urging the latter at all times in a downward direction, so as to assure of proper and effective penetration of the disc 42 into the course of earth 43 being dug.

Figure 2:
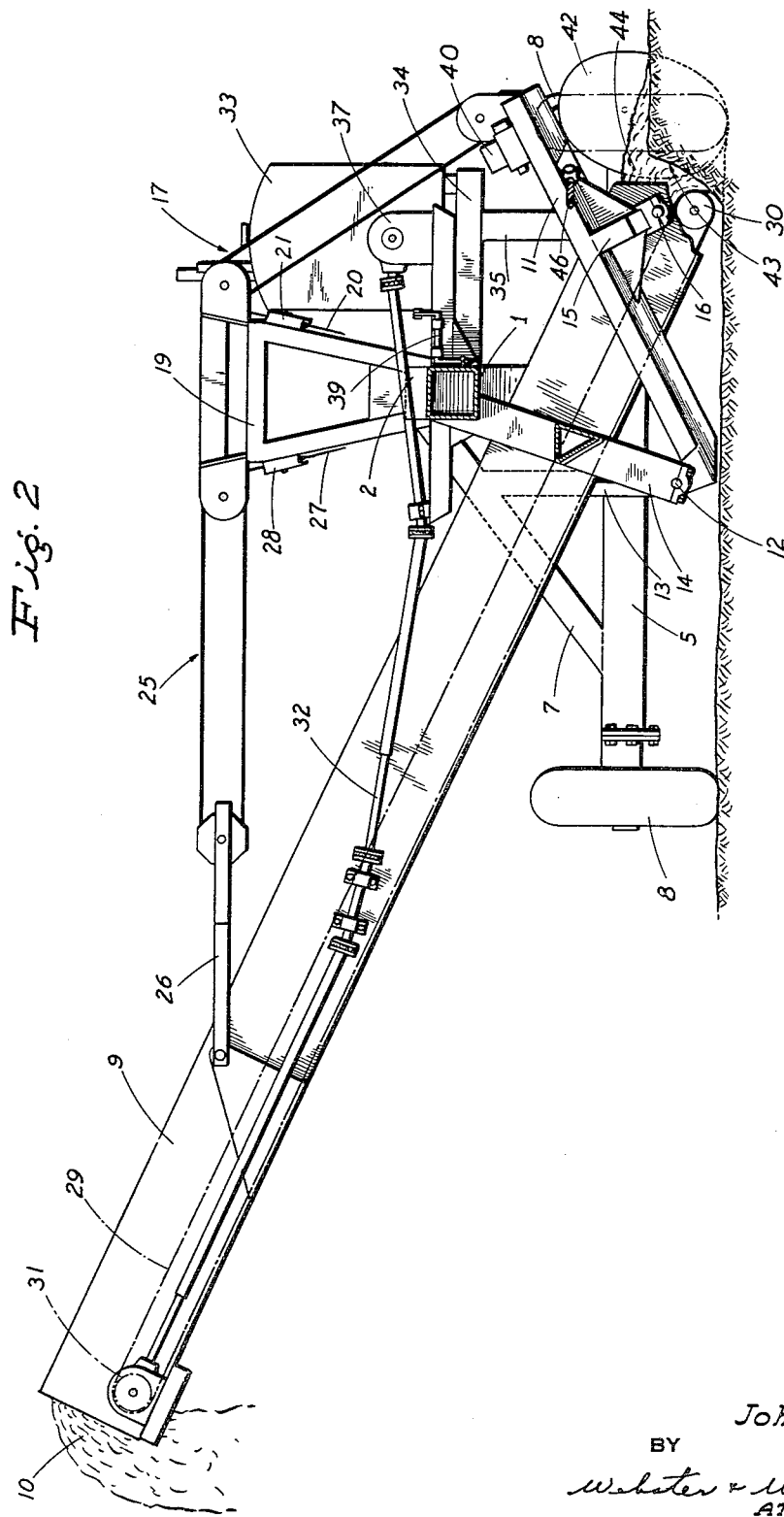
Fig. 2 is a transverse sectional elevation taken on line 2—2 of Fig. 1.

In order to protect the forward lower corner of the elevator conveyor 9, such corner is fitted with a shield and earth deflector 45; such deflector being shown in Fig. 1, but broken away in Fig. 2.

In order to prevent any undue rearward deflection of the mount, upon the disc 42 encountering excessively hard earth or comparable working conditions, a normally somewhat slack safety cable 46 is connected between the front of the U-shaped frame 11 and an advanced point on the draft beam 1, as shown; the slack of the safety cable 46 being sufficient that it does not restrict normal up and down adjustment of said U-shaped frame 11.

In operation of the implement, the wheels 8 run on the ground level to which the disc 42 has previously dug; the wheel adjacent said disc 42 running directly to the rear of the latter.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An elevating loader comprising an above-ground main frame structure adapted for forward travel, a driven elevator conveyor extending from below said main frame structure laterally at an upward incline, suspension means between the main frame structure and the upper portion of the elevator conveyor, a pair of longitudinally spaced rigid legs projecting downward from the main frame structure on opposite sides of the elevator conveyor, a U-shaped mounting frame extending transversely at a downward incline and straddling the lower portion of the elevator conveyor, the incline of the U-shaped mounting frame being generally opposed to the incline of the elevator conveyor, means pivoting the lower ends of the mounting frame to corresponding ends of said legs whereby said mounting frame is vertically swingable in a transverse vertical plane, adjustable suspension means between the outer end portion of the mounting frame and said main frame structure, means pivoting the mounting frame intermediate its ends on the straddled lower portion of the elevator conveyor, a fixed standard depending from the upper and outer end portion of the mounting frame, and a blade on the standard adjacent the lower end of the elevator conveyor in position to dig earth and deliver the same onto said elevator conveyor upon such forward travel of the loader.

2. An elevating loader comprising an above-ground main frame structure adapted for forward travel, a driven elevator conveyor extending from below said main frame structure laterally at an upward incline, suspension means between the main frame structure and the upper portion of the elevator conveyor, a pair of longitudinally spaced rigid legs projecting downward from the main frame structure on opposite sides of the elevator conveyor a U-shaped mounting frame extending transversely and straddling the lower portion of the elevator conveyor, means pivoting the laterally inner end of the mounting frame to corresponding ends of said legs whereby said mounting frame is vertically swingable in a transverse vertical plane, a block and tackle cable unit connected between the outer end of the mounting frame and a point thereabove on the main frame structure, fixed brackets depending from opposite sides of the U-shaped mounting frame intermediate its ends, means pivoting the brackets to adjacent sides of the lower portion of the elevator conveyor, the lower end of said conveyor being adjacent the ground, a fixed standard depending from the outer end of said mounting frame, and a disc blade journaled in connection with the standard adjacent the lower end of the conveyor and in position to dig earth and deliver the same onto said elevator conveyor upon such forward travel of the loader; the main frame structure being arched intermediate its ends, the elevator conveyor extending at an incline upwardly through such arch from one side to the other, and the mounting frame extending at a downward incline to below said arch from said one side.

3. An elevating loader comprising a longitudinal draft beam adapted at the forward end for coupling to a tractor, a transverse axle beam fixed to the rear end of the draft beam, wheels supporting the axle beam at opposite ends, the draft beam having substantial ground clearance at a portion intermediate its ends, a driven elevator conveyor extending from below said portion of the draft beam laterally at an upward incline, a pair of longitudinally spaced rigid legs projecting downward from said portion of the draft beam on opposite sides of the elevator conveyor, a U-shaped mounting frame extending transversely at a downward incline and straddling the lower portion of the elevator conveyor, the incline of the U-shaped mounting frame being generally opposed to the incline of the elevator conveyor, means pivoting the lower ends of the mounting frame to corresponding ends of said legs whereby said mounting frame is vertically swingable in a transverse vertical plane, adjustable suspension means between the outer end portion of the mounting frame and said draft beam, suspension means between the draft beam and the upper portion of the elevator conveyor, means pivoting the mounting frame intermediate its ends on the straddled lower portion of the elevator conveyor, a fixed standard depending from the upper and outer end portion of the mounting frame, and a blade on the standard adjacent the lower end of the elevator conveyor in position to dig earth and deliver the same onto said elevator conveyor upon such forward travel of the loader.

4. An elevating loader comprising in above-ground frame structure which includes a longitudinal draft beam arranged at its forward end for draft connection and wheel-supported at its rear end, legs depending from the beam in longitudinally spaced relation ahead of the wheels, a driven elevating conveyor extending laterally between the legs below the beam from adjacent ground level at an upward incline from its lower end, suspension means between the main frame structure and the upper portion of the elevator conveyor, a rigid U-shaped mounting frame including side arms straddling the lower portion of the conveyor and extending from the legs to a point laterally out from and above the lower end of the conveyor, the mounting frame including a longitudinal member connecting the outer ends of the side arms, means pivoting the side arms on the legs, means adjustably suspending said member intermediate its ends from the frame structure, a disc blade supported from said member in position to dig earth and deliver the same onto the conveyor upon forward movement of the loader, and pivotal connection means between the side arms intermediate their ends and the conveyor adjacent the lower end thereof.

5. A loader, as in claim 4, in which the draft beam is arched intermediate its ends; the elevator conveyor extending under the arched portion of said beam.

6. A loader, as in claim 4, in which the pivotal connection of the arms and legs is disposed at a level relative to that of the disc blade so as to minimize the change of angular position of the disc in a vertical plane upon vertical adjustment of the mounting plane.

References Cited in the file of this patent

UNITED STATES PATENTS

| | | |
|---|---|---|
| 1,471,887 | Dorney et al. | Oct. 23, 1923 |
| 2,045,387 | Green et al. | June 23, 1936 |
| 2,109,794 | Gustafson | Mar. 1, 1938 |
| 2,489,991 | Tucker | Nov. 29, 1949 |
| 2,527,415 | Hancock | Oct. 24, 1950 |
| 2,618,082 | Dunn et al. | Nov. 18, 1952 |